United States Patent [19]

Lipschutz

[11] Patent Number: 4,649,272

[45] Date of Patent: Mar. 10, 1987

[54] KEY OPERATED LOCK MECHANISM WITH MIXED MECHANICAL AND ELECTRIC CONTROL

[75] Inventor: Paul Lipschutz, Croissy, France
[73] Assignee: Neiman S.A., Courbevoie, France
[21] Appl. No.: 728,907
[22] Filed: Apr. 30, 1985
[30] Foreign Application Priority Data
  May 22, 1984 [FR] France .................. 84 07938
[51] Int. Cl.$^4$ ............................................. G01D 5/34
[52] U.S. Cl. ......................................... 250/229; 70/255
[58] Field of Search ................. 70/238, 252, 255; 250/216, 221, 229, 566

[56] References Cited

U.S. PATENT DOCUMENTS 3,887,029 6/1975 Lipschutz et al. ............. 70/255 X

FOREIGN PATENT DOCUMENTS 2308147 11/1976 France .................. 250/229

Primary Examiner—Eugene R. LaRoche
Assistant Examiner—Steven J. Mottola
Attorney, Agent, or Firm—Dowell & Dowell

[57] ABSTRACT

A lock with mixed mechanical and electrical control which utilizes a key device which includes mechanical notching for cooperatively engaging pistons carried within the lock stator and rotor and which also includes a signal emitter which is selectively alignable with a signal receiver which activates an electro-mechanical drive which is operatively connected to control the locking and unlocking of the lock bolt when the key device is at a position of the rotor which is different from the position at which the key device is introduced into the rotor.

3 Claims, 3 Drawing Figures

KEY OPERATED LOCK MECHANISM WITH MIXED MECHANICAL AND ELECTRIC CONTROL

BACKGROUND TO THE INVENTION

The invention relates to a key-operated vehicle lock mechanism incorporating mechanical and electric control, utilising an emitter of a coded control signal and a receiver of the said signal, the emitter being independent of the receiver.

STATEMENT OF PRIOR ART

A device of the above type is known which is utilised for the remote control of the locking and unlocking of the doors of an automobile vehicle. The use of this device for the control of the anti-theft steering lock would be very desirable to increase security against theft, but certain designers wish the key for locking the doors to be different from the anti-theft lock key. Moreover the direct utilisation of the emitter to control the anti-theft device requires numerous security precautions and the education of drivers to the handling of a new device.

OBJECT OF THE INVENTION

The present invention aims at mitigating these drawbacks and objections by means of a new bolt combining the emitter of a coded message with a traditional mechanical lock.

SUMMARY OF THE INVENTION

According to the invention there is provided a key-operated vehicle lock mechanism including a bolt movable between locking and unlocking positions and an electro-mechanical drive operatively connected to the bolt, the provision of a. a stator having a bore therein, b. a rotor rotatable within the bore and having a recess therein, c. a plurality of pairs of pistons movable in radial openings respectively in the rotor and stator between a rotor locked position and a rotor release position, the pistons in the rotor capable of entry at their innermost ends into the recess, d. a key having:

i. a body formed with a series of coded notches engageable by the innermost ends of the rotor pistons whereby the pistons are moved to the rotor release position;

ii. an emitter within the body for emitting coded signals along a predetermined axis, and iii. manually operable switch means on the body to control the emitter, and e. a receiver in the stator housing electrically connected to the electro-mechanical drive, the rotor being movable from a first angular position in which the receiver is not in alignment with the predetermined axis of the coded signals to a second angular position where alignment takes place, whereby on actuation of the switch the electro-mechanical drive moves the bolt to its unlocking position.

By means of the lock mechanism according to the invention an additional security is provided, compared with remote control alone, thanks to the mechanical bolt which permits utilisation of the emitter and the associated receiver only after mechanical actuation of this bolt.

BRIEF DESCRIPTION OF DRAWINGS

The invention will be clearly understood on reading of the following description given with reference to the accompanying drawing, wherein.

DESCRIPTION OF PREFERRED EMBODIMENTS

Figure 1:
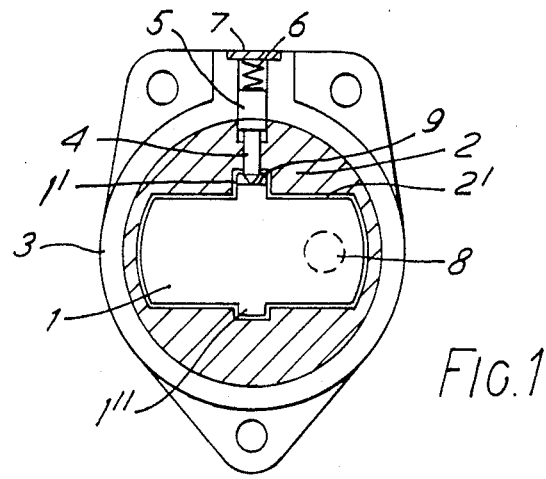
FIG. 1 is a cross-sectional view of an anti-theft lock bolt according to an example of embodiment of the invention.
Figure 2:
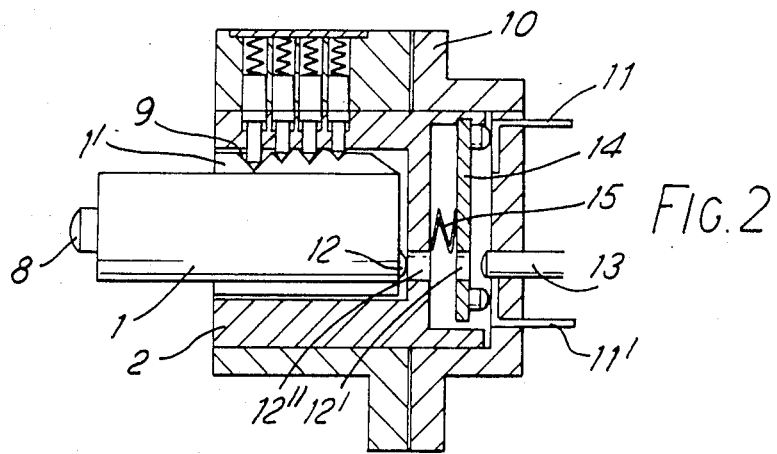
FIG. 2 is a longitudinal sectional view of the bolt according to FIG. 1.

The bolt comprises a combination key and emitter 1 wherein the emitter can work by infra-red radiation, ultrasonics, radio waves, etc. A rotor 2 of the mechanical bolt comprises a recess or bore 2' closed by an end wall for receiving the combination key and emitter 1 which comprises a rib 1' equipped with a coded notching 9, similar to that of a conventional key. A boss 1" serves as reference for the notching 9. The bolt likewise comprises a stator 3 and pairs of pistons 4–5, returned by springs 6, are enclosed in the bolt 2-3 by a closure plate 7 and co-operate with the notching 9 to permit rotation of the rotor 2 in the stator 3 in the usual way.

The combination key and emitter 1 carries a control knob 8 and an emitter diode 12 (in the case of luminous radiation) transmitting the coded message to a receiver diode 13 mounted to a casing 10 so as to be fast with the stator 3. The rotor 2 is fast with a small plate 14 equipped with a window 12' and carrying movable contacts co-operating with fixed contacts 11, 11' under the action of a spring 15. A window 12" is provided in the end wall of the rotor 2 opposite to the window 12'.

Figure 3:
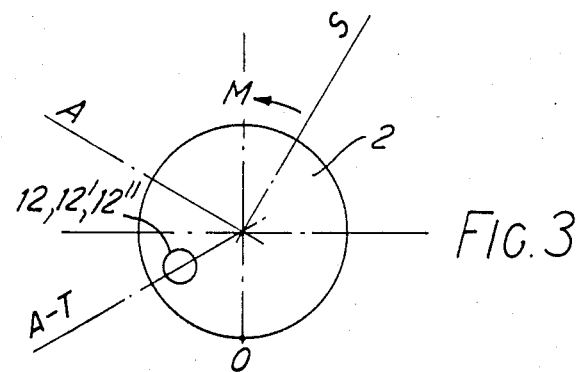
FIG. 3 is a diagram of the angular positions of the rotor of the bolt according to FIGS. 1 and 2.

In the position "0" (FIG. 3) the combination key and emitter 1 can be introduced into the recess 1', the notching 9 co-operating with the pistons 4–5 to liberate the rotor 2. In this position the emitter diode 12 is not opposite the receiver diode 13. Thus the actuation of the control knob 8 does not permit passage of the signal from the emitter diode 12 to the receiver diode 13.

After rotation of the rotor 2 to the "anti-theft lock"-position (A-T), the emitter diode 12 comes opposite the receiver diode 13 through the windows 12' and 12". The actuation of the knob 8 permits the transmission of the coded message from the emitter diode 12 to the receiver diode 13. The receiver (not shown) connected to the diode 13 then orders electro-mechanical unlocking of the bolt. If the rotation of the rotor 2 is then continued, the necessary electrical contacts are obtained such as "Acc" (auxiliary), "M" (normal running), starter "S". The emitter diode 12 is no longer facing the receiver diode 13 during these movements, and any action upon the knob 8 has no effect.

If a return is effected in the opposite direction to the position "Anti-theft lock", an action upon the knob 8 commands locking of the bolt. Then the return to the position "0" permits withdrawal of the combination key and emitter 1.

I claim:

1. In a key-operated vehicle lock mechanism including a bolt movable between locking and unlocking positions and an electro-mechanical drive operatively connected to said bolt, the provision of a. a stator having a bore therein, b. a rotor rotatable within said bore and having a recess therein, c. a plurality of radial aligned openings in said rotor and stator, d. a plurality of pairs of inner and outer piston means movable within said radial aligned openings in said rotor and stator, said inner and outer piston means being movable within said radial aligned openings between a rotor locked position where said inner and outer piston means prevent said rotor from moving relative to said stator and a rotor unlocked position wherein said rotor is movable with respect to said stator, e. each of said inner piston means having an innermost end which is selectively receivable within said recess in said rotor, f. a combination key and emitter means having a body formed with a series of notches, a signal emitter means disposed within said body for emitting coded signals outwardly from said body and along a predetermined axis, said notches being engageable by said innermost ends of said inner piston means when said combination key and emitter means is inserted within said rotor, a manually operable switch means on said body to control said signal emitter means, g. signal receiver means mounted within said stator and being electrically connected to the electromechanical drive, h. said rotor being movable from a first angular position wherein said signal receiver means is in a non-alignment with said predetermined axis along which said coded signals are emitted to a second angular position wherein said signal receiver means is aligned with said predetermined axis along which said coded signals are emitted, and i. said manual switch means being selectively operable when said signal receiver means is aligned with said predetermined axis to generate a coded signal from said signal emitter means to said signal receiver means to thereby activate the electromechanical drive to move the bolt to its unlocked position.

2. The key-operated vehicle lock mechanism of claim 1, wherein said signal emitter means comprises an infrared emitter diode.

3. The key-operated vehicle lock mechanism of claim 1 including a switch for ignition and starting purposes, said switch having a contact plate mounted within said stator and secured to said rotor so as to be rotatable therewith, a plurality of contacts mounted within said stator, said rotor and said contact plate having aligned windows therein through which said coded signals can pass from said signal emitter means to said signal receiver means.

* * * * *